United States Patent [19]
Joong et al.

[11] Patent Number: 5,937,355
[45] Date of Patent: Aug. 10, 1999

[54] EMERGENCY CALL HANDLING IN A CELLULAR TELECOMMUNICATION SYSTEM

[75] Inventors: Donald Joong; Nikos Katinakis, both of Montreal; Akbar Rahman, Brossard, all of Canada

[73] Assignee: Telefonaktiebolaget LM Ericsson (publ), Stockholm, Sweden

[21] Appl. No.: 08/908,772

[22] Filed: Aug. 8, 1997

Related U.S. Application Data

[63] Continuation of application No. 08/568,653, Dec. 7, 1995, abandoned.

[51] Int. Cl.$^6$ ................................................ H04Q 7/38
[52] U.S. Cl. .................. 455/466; 379/40; 379/106.1; 379/45; 379/91.01
[58] Field of Search .................. 455/466; 370/111, 370/8; 379/106, 45, 91, 40, 106.1, 91.01; 375/283

[56] References Cited

U.S. PATENT DOCUMENTS

| | | | |
|---|---|---|---|
| 3,898,390 | 8/1975 | Weels et al. ................. | 379/59 |
| 4,157,540 | 6/1979 | Oros .......................... | 340/539 |
| 4,324,954 | 4/1982 | Taylor ........................ | 179/90 B |
| 4,371,751 | 2/1983 | Hilligoss, Jr. et al. ....... | 179/5 R |
| 4,417,100 | 11/1983 | Carlson et al. .............. | 179/5 R |
| 4,511,887 | 4/1985 | Fiore ......................... | 340/539 |
| 4,577,182 | 3/1986 | Millsap etal. ............... | 340/539 |
| 4,641,127 | 2/1987 | Hogan et al. ................ | 379/40 |
| 4,724,538 | 2/1988 | Farrell ........................ | 379/59 |
| 4,993,089 | 2/1991 | Smith et al. ................. | 379/39 |
| 5,016,269 | 5/1991 | Rogers et al. ............... | 379/59 |
| 5,195,126 | 3/1993 | Carrier et al. ............... | 379/45 |
| 5,235,598 | 8/1993 | Sasuta ........................ | 370/110.01 |
| 5,334,974 | 8/1994 | Simms et al. ................ | 340/990 |
| 5,337,342 | 8/1994 | Kruger et al. ............... | 379/40 |
| 5,351,235 | 9/1994 | Lahtinen .................... | 370/58.1 |
| 5,365,570 | 11/1994 | Boubelik ..................... | 379/59 |
| 5,388,147 | 2/1995 | Grimes ....................... | 379/59 |
| 5,404,355 | 4/1995 | Raith .......................... | 370/95.1 |
| 5,442,809 | 8/1995 | Diaz et al. .................. | 455/54.1 |
| 5,454,024 | 9/1995 | Lebowitz .................... | 379/40 |
| 5,479,482 | 12/1995 | Grimes ....................... | 379/59 |
| 5,507,006 | 4/1996 | Knight ........................ | 370/111 |
| 5,528,664 | 6/1996 | Slekys et al. ................ | 370/8 |
| 5,544,225 | 8/1996 | Kennedy, III et AL. ..... | 379/59 |
| 5,546,444 | 8/1996 | Roach, Jr. et al. .......... | 379/106 |
| 5,563,931 | 10/1996 | Bishop et al. ............... | 379/59 |
| 5,579,372 | 11/1996 | Astrom . | |
| 5,598,460 | 1/1997 | Tendler ....................... | 379/59 |
| 5,687,194 | 11/1997 | Paneth et al. ............... | 375/283 |
| 5,689,548 | 11/1997 | Maupin et al. .............. | 379/45 |
| 5,719,918 | 2/1998 | Serbetciouglu et al. ..... | 379/91 |
| 5,721,762 | 2/1998 | Sood . | |

FOREIGN PATENT DOCUMENTS

| | | |
|---|---|---|
| 332147A1 | 12/1984 | Germany . |
| WO 92/14329 | 8/1992 | WIPO . |
| 9526113 | 9/1995 | WIPO . |

OTHER PUBLICATIONS

Mouly, "The GSM System for Mobile Communications", pp. 556–565, 1992.
TRA, "Understanding the Basics of PCS and Cellular", Chapter 5, 1998.

Primary Examiner—William Cumming
Attorney, Agent, or Firm—Smith & Danamraj, P.C.

[57] ABSTRACT

An emergency call handling system and method for a cellular telecommunications system. The emergency call handling system is provided with at least one subscriber terminal which upon failure to seize a voice connection to an emergency center for an emergency call, transfers data messages over the digital control channel to the emergency center advising it that the user of this one subscriber terminal has an emergency situation. Advantage is found with the present invention in that in times of radio voice channel and/or network traffic congestion resulting in call set up failure, the information relating to a user emergency can be forwarded as data messages to the emergency center.

46 Claims, 6 Drawing Sheets

EMERGENCY CALL HANDLING IN A CELLULAR TELECOMMUNICATION SYSTEM

This is a continuation of application Ser. No. 08/568,653, filed Dec. 7, 1995, now abandoned.

BACKGROUND OF THE INVENTION

1. Technical Field of the Invention

The present invention relates to an emergency call handling system for a cellular telecommunication system. In particular, the present invention is directed to forwarding user emergency information via data messages over the radio digital control channel and across the network to an emergency center when emergency voice calls cannot be set up when, for example, there exists radio voice channel congestion, network congestion, or both.

2. Background of the Invention

Providers of emergency services in North America such as in fire, police, and rescue departments are assisted in providing emergency services by the introduction of the 911 emergency number. One of the important aspects of the 911 emergency service is the public safety answering point (PSAP) system which acts as an emergency center (EC) for handling emergency calls.

All 911 calls originating from the cellular and landline telephone networks are routed to the closest PSAP for service. The PSAP also obtains the telephone number of the calling party from the network. Utilizing this calling telephone number, the PSAP accesses a remote database containing information relating telephone numbers to users' names and addresses. For a landline telephone, the billing address is the address where the telephone is located. The address information is important since often the calling party is incapable of supplying the location information or does not have sufficient time to supply this information. The location information then allows the PSAP to direct assistance to the landline telephone user involved in the emergency.

As described above, 911 calls originating from the cellular network are routed to the PSAP similarly as 911 calls originating from a landline network. However, due to the unique nature of the cellular system, other methods have also been established to aid in emergency call handling.

For example, it is known to have a 911 button, or some other pre-programmed button, on the terminal or mobile station (MS). Such a feature is disclosed in U.S. Pat. No. 5,365,570 issued to Boubelik on Nov. 15, 1994 where the MS can be dedicated to emergency use. Other known MS features to aid in emergency calls are auto-power on, remote actuation of a call, and auto dial (and redial) of a pre-programmed emergency number.

In another example, once a call is successfully set up in the cellular network, it is known to transmit on the voice channel, geocoordinates of the location where the MS is located. Such a method is disclosed in U.S. Pat. No. 5,388,147 issued to Grimes on Feb. 7, 1995. Grimes further teaches converting the geo-coordinates into conventional municipality or rural address locations when the emergency call is initiated.

While the known prior art teaches methods that facilitate the transmittal of information to the PSAP from MS's, these methods are based on the premise that the user of the cellular telephone is able to make a voice call connection to the PSAP. This voice call connection comprising of a radio voice channel and a network voice trunk connection between the mobile switching center (MSC) and the PSAP. However, it should be understood that in the cellular industry, the number of radio voice channels allocated to a particular cell site are limited and may be all in use resulting in failure to set-up a call. Also even when a radio voice channel is successfully allocated, the call may still not be set up be due to network congestion elsewhere in the cellular system.

Furthermore, the probability of failing to set-up a call increases significantly in the case of a large scale disaster like an earthquake where the network is flooded with emergency calls. This is also true for local emergencies such as a major traffic highway accident in which several subscribers may be trying to access the same cell associated with that part of the highway. In such situations the user may attempt to call the PSAP many times and still not be able to establish a voice call connection. If the terminal is low on battery power and several attempts are made to contact the PSAP, then it is possible that the terminal may run out of battery power during these attempts and the PSAP will never be informed of the user's emergency.

Accordingly, there is a need to provide a method and system of informing the PSAP of the user's emergency in the event the user of a MS is unable to obtain a voice call connection to the PSAP.

SUMMARY OF THE INVENTION

The present invention is directed towards an emergency call handling system for a cellular communication system. The emergency call handling system is provided with at least one subscriber terminal which upon failure to seize a voice call connection to an emergency center (EC) on an emergency call, transfers data messages, these messages preferably being of the type of data messages known as short message service (SMS) messages, over the radio digital control channel (DCC) through a base station (BS) and a mobile switching center (MSC) to the EC advising the EC that the user of this one subscriber terminal has an emergency situation.

By sending a data message over the DCC and having the MSC analyze the data message and forward emergency data to the EC, the present invention provides a means for the terminal to communicate with the EC when a voice call cannot be set up. In particular if the voice call cannot be set up due to radio voice channel congestion and/or network congestion then data messages are sent over the DCC and across the network.

In accordance with one aspect of the present invention, there is provided an emergency call handling system for a cellular communication system for routing emergency calls made by a plurality of subscriber terminals to an EC. The system comprises a MSC for controlling signalling with a plurality of BS's. It should be understood that the term MSC means a mobile switching center typical of the D-AMPS standard telecommunications system of North America or a mobile switching center used in the GSM standard cellular telecommunications system where control of the switching of the BS's is controlled by a base station controller. The base station controller is an intermediate node located between the BS's and MSC. The system further includes at least one subscriber terminal normally communicating with the MSC through one BS over a DCC when in an idle mode and one of a plurality of voice channels (VC's) when in an active subscriber communication mode. It should be understood that the term VC includes both a digital voice channel and an analogue voice channel. The one terminal includes emergency call means for initiating an emergency voice call via the BS through the MSC to the EC, call failure detection means for detecting when the emergency voice call has failed to be set up with the EC, and data transmission means, responsive to a call failure detection to transmit an emergency data message over the DCC through the BS and MSC to the EC.

An advantage of this aspect of the present invention is that it permits the subscriber terminal to send a data message to the EC over the DCC without wasting time waiting for an available VC when the subscriber terminal fails to set-up a voice call connection to the EC.

The EC upon receipt of the emergency data message from one terminal preferably includes means to immediately transmit an acknowledgment data message to the one terminal via the MSC and BS over the DCC. This message will include data indicating that the EC has been informed of the user emergency. In addition, the message will include data indicating that the EC will call back the user and possibly the call back time and that the user should not attempt any more calls so as to conserve the MS battery power. The EC also preferably includes call back means that, after acknowledgment of the data emergency message from the one terminal, initiates a voice call back to said one terminal through the MSC and BS over a VC.

It is envisaged within the scope of the present invention that the emergency data message from the MS will include data information identifying the data message as an emergency message and data information related to the identity of the terminal. The emergency data message may further include data information such as the user's medical history, and information corresponding to the location of the terminal possibly obtained from an associated global positioning satellite (GPS) receiver or some other locating system.

The MSC further preferably includes means for analyzing data messages received on the DCC and, once identifying an emergency data message, the MSC adds to the emergency data message, information as to the location of the terminal for the EC. This information together with the terminal information in the emergency data message will be forwarded directly to the emergency center instead of for example to the user's message center (MC) as is the usual case for SMS messages.

Preferably, the call failure detection method located in the one terminal includes count means which counts up a pre-determined number of consecutive emergency call failures and thereafter enables the data transmission means to transmit said emergency message. This counter is preferably factory preset to three and after the third failed attempt the emergency data message would be transmitted over the DCC. Preferably, the call failure detection method enables the data transmission means to transmit the emergency data upon the determination of a failure to be successfully allocated a radio VC. The call failure detection method further includes means, such as a busy tone detection circuit, to detect network congestion if a radio VC is successfully allocated.

The present invention has the advantage of being able to send more emergency messages in a data format over the network as compared to voice calls over the network because an emergency data message consumes less bandwidth than the equivalent emergency voice call. Accordingly, in an extreme catastrophic emergency situation, the EC would be able to receive information from more users with respect to the emergency, via data messages then it would via voice calls.

In accordance with another aspect of the present invention there is provided a method for emergency call handling in a cellular communication system for routing emergency calls made by a plurality of subscriber terminals to an EC via a MSC controlling a plurality of BS's. The method comprises the steps of:

at least one subscriber terminal normally communicating with one selected from the group of a DCC and a VC via the BS to the MSC, said one subscriber terminal:
initiating an emergency voice call to the EC over the VC to the BS and through the MSC to the EC, detecting when the emergency voice call has failed to be set up with the EC, and responsive to detecting a failed set up of an emergency voice call with the EC transmitting an emergency data message over the DCC to the BS through the MSC, and the MSC analyzing the data messages and transmitting the emergency data message directly to the EC.

In accordance with yet another aspect of the present invention there is provided an emergency call handling system for a cellular communication system for routing emergency calls made by a plurality of subscriber terminals to an emergency center. The system comprises an MSC for controlling signaling with a plurality of BS's. The system includes at least one subscriber terminal normally communicating with the MSC through one BS. The one terminal including data transmission means for transmitting data messages including emergency data messages over a DCC through the BS to the MSC. The system includes data analyzing means in the MSC for analyzing the data messages received from said one terminal to route emergency data messages to the EC.

An advantage of this aspect of the present invention is that the MSC can analyze incoming data messages and immediately route an emergency message to the EC.

In accordance with yet another aspect of the present invention there is provided a method for emergency call handling in a cellular communication system for routing emergency calls made by a plurality of subscriber terminals to an EC via a MSC controlling a plurality of BS's. The method comprises the steps of:

at least one subscriber terminal transmitting data messages, including emergency data messages, over a DCC through the BS to the MSC; and, analyzing in the MSC data messages received from said one terminal routing emergency data messages received in the MSC to the EC.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF EMBODIMENTS

Figure 1:
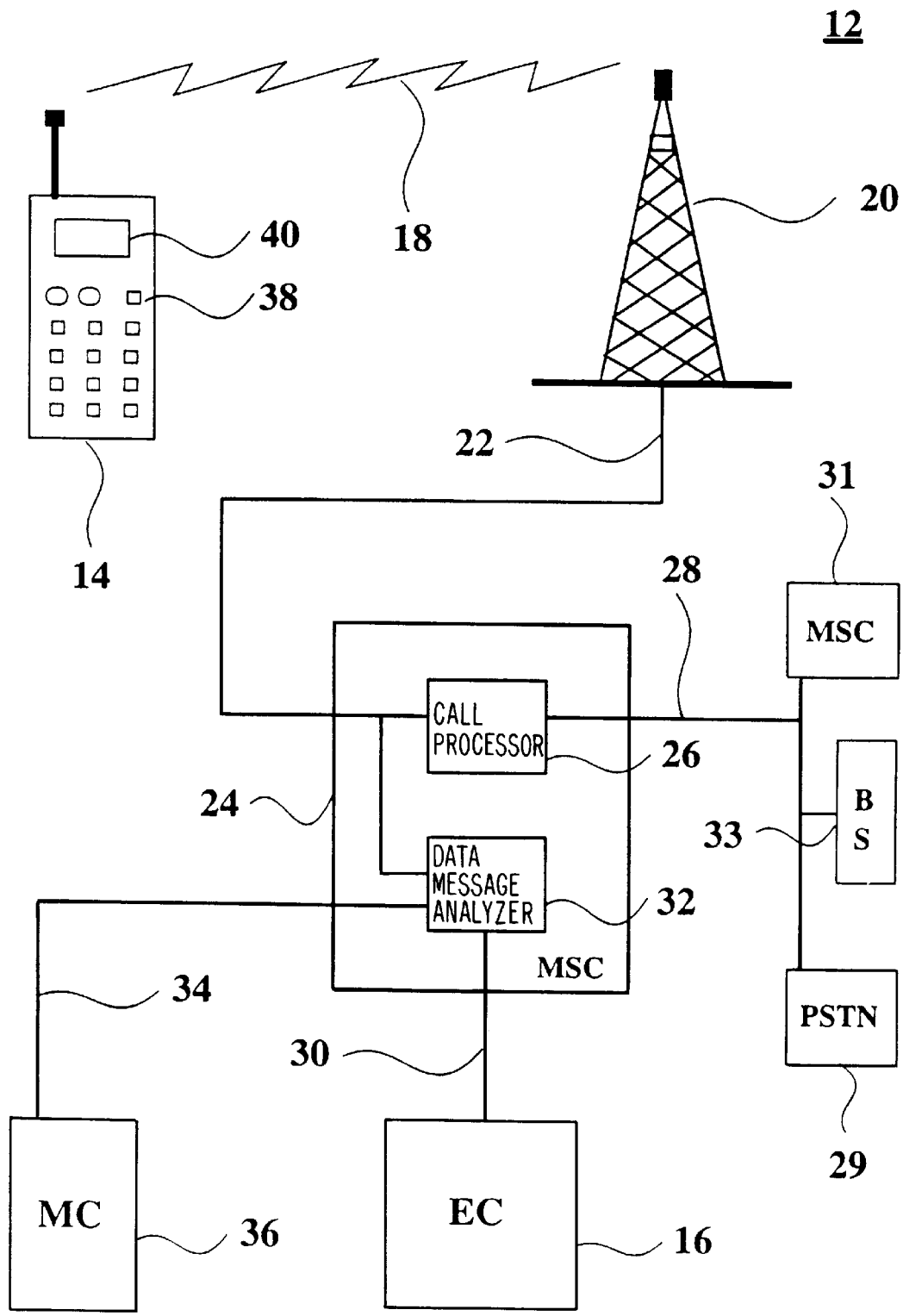
FIG. 1 is a schematic drawing showing elements of the cellular telecommunication systems of the present invention.

Referring to FIG. 1, there is shown an emergency call handling system for use with a cellular communication system 12 for routing emergency calls made by a plurality of subscriber terminals or mobile stations (MS) 14. MS 14 communicates with the emergency center (EC) 16 via radio waves 18 to radio base station (BS) 20. The BS 20 is connected through, for example, land lines 22 to the mobile switching center (MSC) 24. The MSC 24 includes normal processing of telephone calls at 26 whereby these calls may be routed along line 28 either to another PSTN 29, MSC 31, or back to another radio base station 33. Also the MSC is provided with an analyzing means 32 which analyzes data messages received on line 22 and routes emergency data messages to the emergency center 16 along line 30. All other data messages are forwarded to the appropriate message center (MC) 36 along line 34. In the preferred embodiment, the emergency center is a public safety answering point (PSAP). It should be understood that the radio waves 18 shown between the mobile station or MS 14 and BS 20 may comprise either voice channel (VC) frequencies or digital control channel (DCC) frequencies. The use of DCC's and purposes are well known in the art.

It is within the scope of the present invention to use the DCC to transmit from the MS 14 a data message which can be in the form of a short message service (SMS) message. This data message is transferred over the DCC to the BS 20 and then along line 22 to the MSC 24. The analyzing device 32 recognizes the emergency data message and forwards it along line 30 to the EC 16. Within the scope of the present invention, the EC will acknowledge receipt of the emergency data message from the MS by transmitting a data message to the MS informing the MS of the EC's successful receipt of the MS emergency data message. The EC will then call back the MS as quickly as possible. In accordance with a preferred aspect of the present invention, the MS 14 is equipped with a panic button 39 which when pressed causes the terminal to initiate a normal emergency call to the PSAP through a voice channel seized to the BS 20. If this voice channel is not seized properly or there is a busy signal, and the emergency call fails, and subsequent automatic consecutive emergency call attempts up to a factory pre-set limit of three also fail then the MS will automatically send a pre-defined data message through the DCC to the EC 16 in accordance with the teachings of the present invention.

This data message includes information identifying the message as an emergency so that the analyzing device 32 in the MSC can identify the emergency message. The data message also provides information relating to the identification of the MS 14 and possibly other information such as the user's medical history, and possibly information corresponding to the location of MS 14 within the cellular telephone system 12 Such location identification coordinates and schemes are well known in the art. Additionally, the MSC adds cell information or location information when the message is passed through analyzing means 32 of the MSC. The BS 20 may be identified as a particular cell site of several cell sites within the cellular communication system operating with MSC 24 such that the EC 16 will know the approximate location of the user of terminal 14. It should be understood that the analyzing means of the MSC may comprise some aspect of a computer within the switching system. Preferably, the MS 14 includes means to count the number of failed attempts to seize a VC when the emergency panic button 34 has been pressed. After three failed attempts to seize a VC, the MS 14 can automatically send the emergency data message emergency. Alternatively, in the event that a busy tone is received by the MS, this can be an indication of network congestion and then the MS 14 will automatically send the data information after three failed emergency call attempts over the DCC 18 to the BS 20. It should be understood that the three failed attempts may be due to any combination of network congestion and failure to seize a voice channel.

Figure 2A:
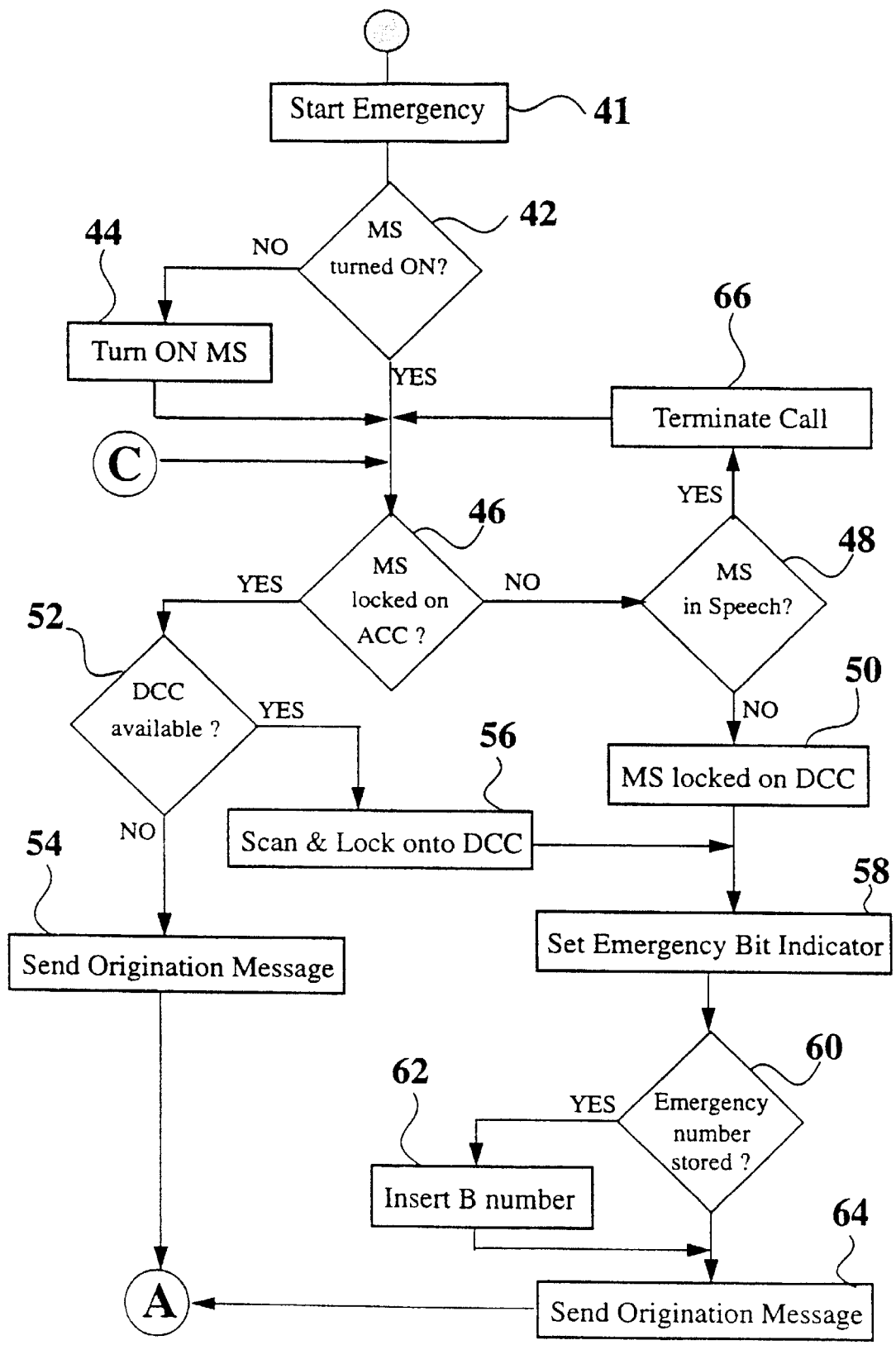
FIGS. 2A and 2B represent flow charts for operation of the subscriber terminal of the present invention.
Figure 2B:
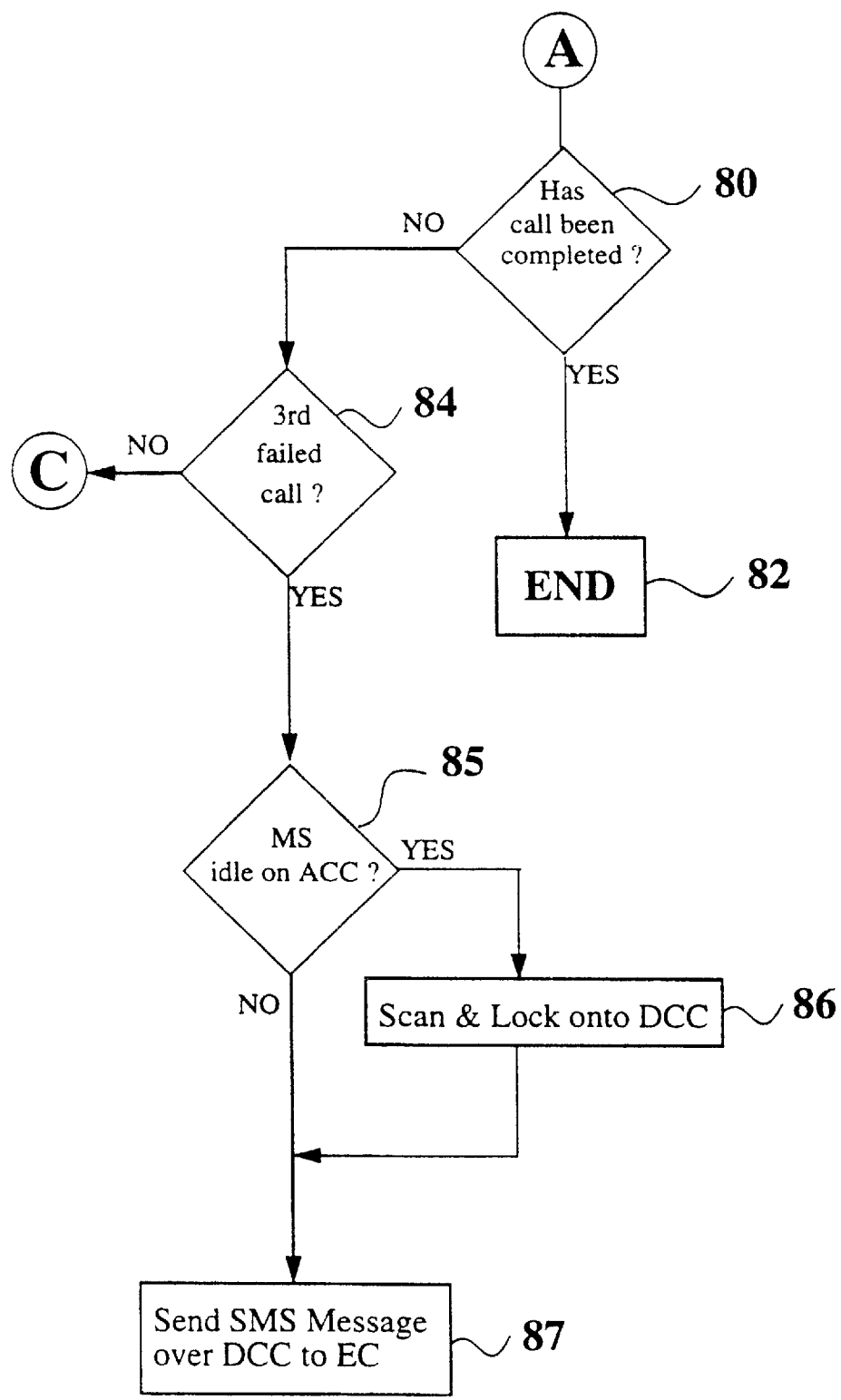

Referring now to FIGS. 2A and 2B there is shown a flow chart for the operation of the MS 14 of the present invention. Referring to FIG. 2A, the emergency button or panic button may be pressed to start the emergency procedure at 41. This may involve either pushing a panic button or a series of predetermined buttons on the terminal to effect the emergency call. Such as, for example, dialing 911 and pressing the send button. At this point, the MS checks at 42 to see if in fact the MS has been powered on. If it has not been powered on it powers the MS turns on at step 44. Next the MS checks at block 46 as to whether or not the MS is idling on an analog control channel (ACC). If the MS is not idling on an ACC, then a check is made if the MS is in the speech mode at 48. If the answer is that the MS is in the speech mode at 48 then the call is terminated at 66 and the mobile goes back to step 46. In the event that the MS is not in the speech mode then the MS is locked onto a digital control channel at 50. Returning to step 46, when the MS is known to be idling on an ACC channel, then a check is made to see whether or not a DCC is available at 52. If no channel is available at that time then a send origination message on the ACC is initiated at 54 which is basically a 911 message or emergency call placed on the voice channel through the RBS 20 to the MSC 24 and the EC 16. Such an emergency originating request message may also include additional information or may be provided with additional information as to the coordinates of the user and the identification of the user on the voice channel. However, it should be understood that this aspect forms no part of the present invention.

If a DCC channel is available at 52 then the MS 14 scans and locks onto the available DCC at 56. Next, as in accordance with steps 56 and 50 an emergency bit indicator is set at 58. If the emergency number is then stored at 60, then this also is inserted as a "B" number at 62 into the information being sent with the next step. If not, B number insertion is skipped. At the next step, an originating message is sent on the DCC at 64. It should be noted that this origination message defers from the one on box 54 because it is being sent over a digital control channel. Both steps 54 and 64 terminate in step A which again starts up in FIG. 2B.

Referring now to FIG. 2B once the origination of the call has been sent at 54 and 64 of FIG. 2A, then the terminal 14 determines if the call has been completed at 80 by checking if a radio VC has been successfully allocated or by checking for network congestion by means such as a busy tone detection circuit. If the call has been completed at 80 it ends the interrogation process at 82 for the terminal 14. The terminal or MS 14 will then be aware of the fact that an actual call has been completed to the EC. If the call is not completed then the terminal checks to see if this has been the third call that has failed to go through and if the answer is no it reverts back to C which again starts up in FIG. 2A at step 46. If the answer is yes then the MS checks for a control channel. If the MS idles on an ACC at 85 then a check is made to scan and lock on a DCC at 86. Then a data message is sent to the EC at 87, or if the MS is idling on a DCC at 95 then it proceeds directly to 87.

Figure 3:
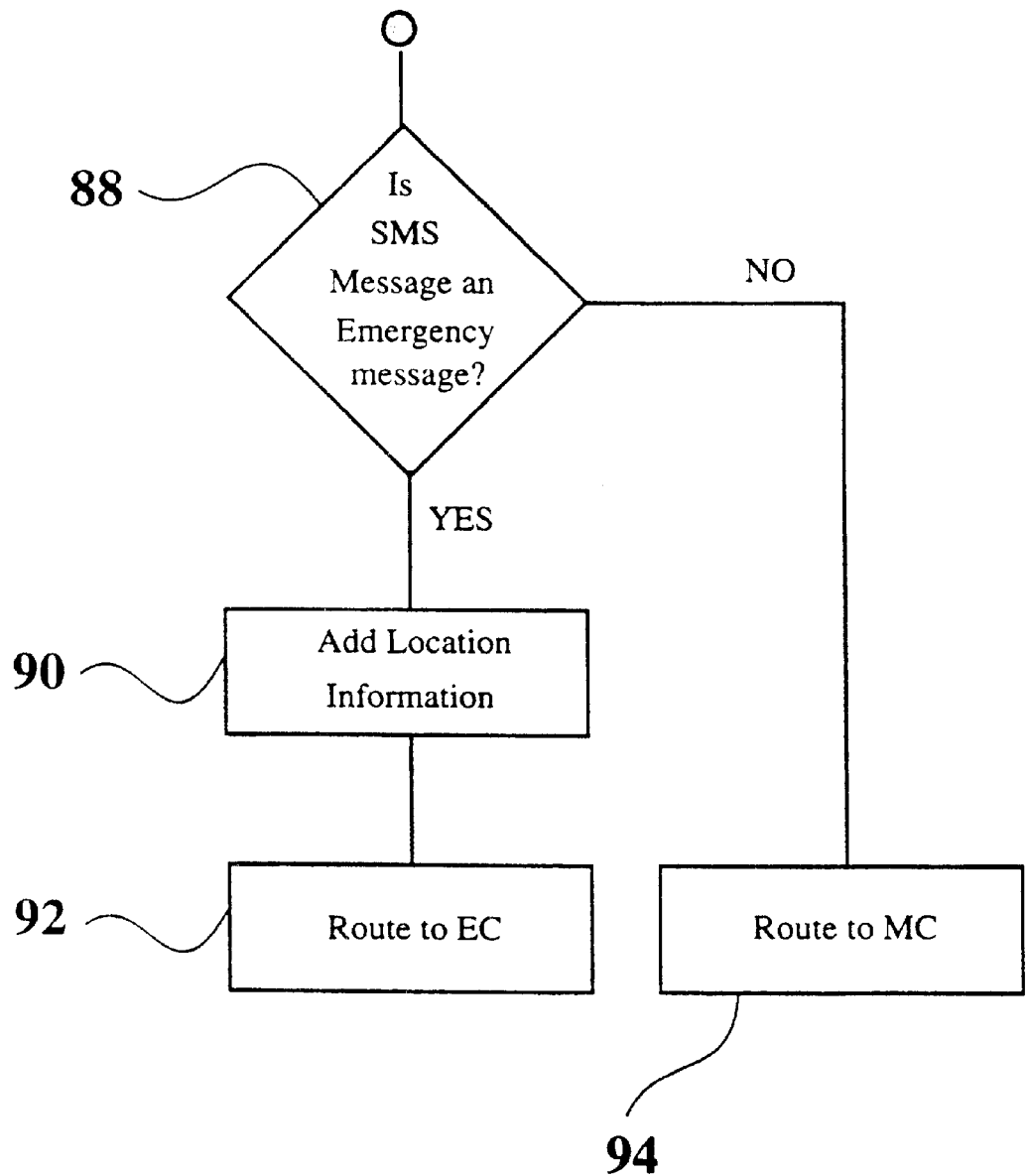
FIG. 3 is a flow chart for operation of the MSC of the present invention.

Referring to FIG. 3, when the MSC receives the data message at 88 it analyzes to see if the message is an emergency message, if so, it adds location information at 90 to the data message and routes it at 92 to the PSAP. Otherwise, the message is routed to the MC at 94.

Figure 4:
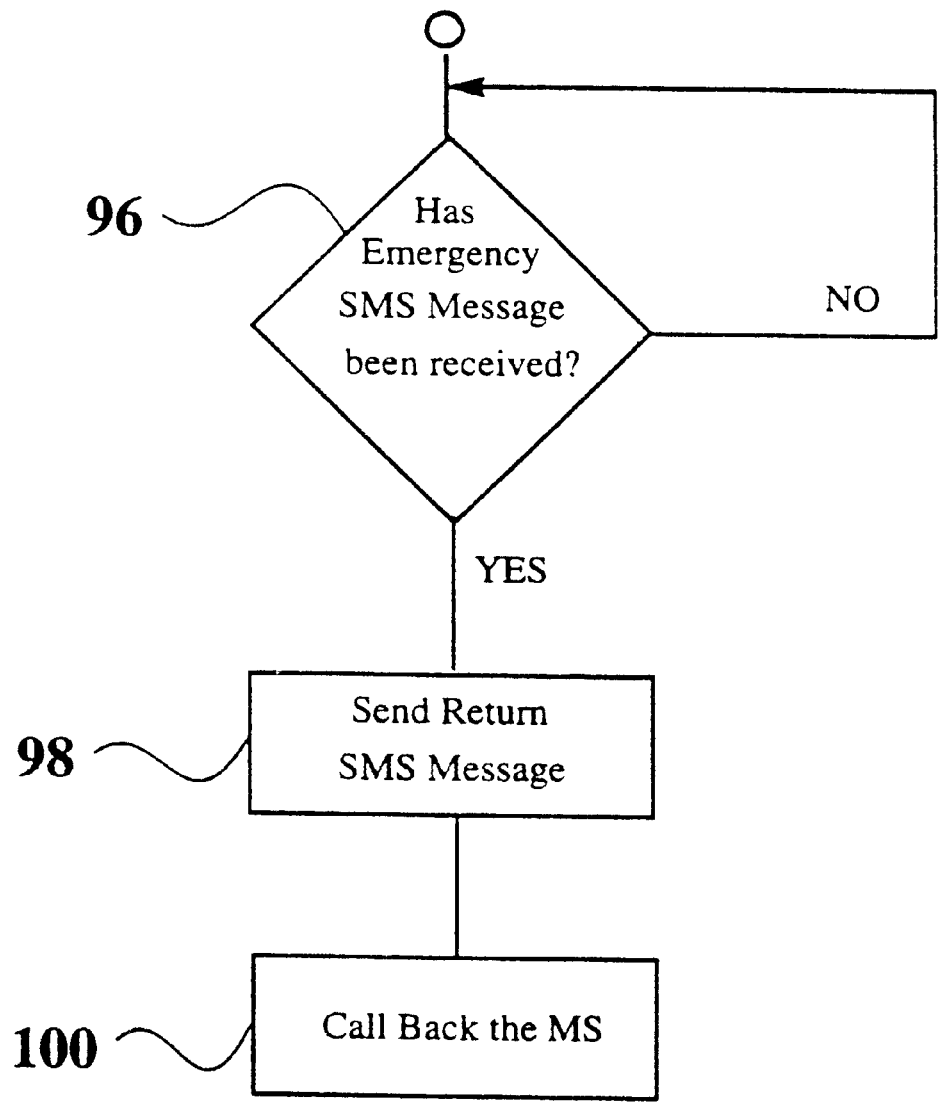
FIG. 4 is a flow chart for the operation of the EC of the present invention; and, FIG. 5 is a simplified block diagram of a MS operating in the system of the present invention.

Referring to FIG. 4, the PSAP in reply to an SMS emergency message being received at 96 the EC sends a return SMS message to the MS at 98 to inform the MS that its emergency SMS message has been successfully received by the EC. The EC will then call back the MS at 100 as soon as possible.

Figure 5:
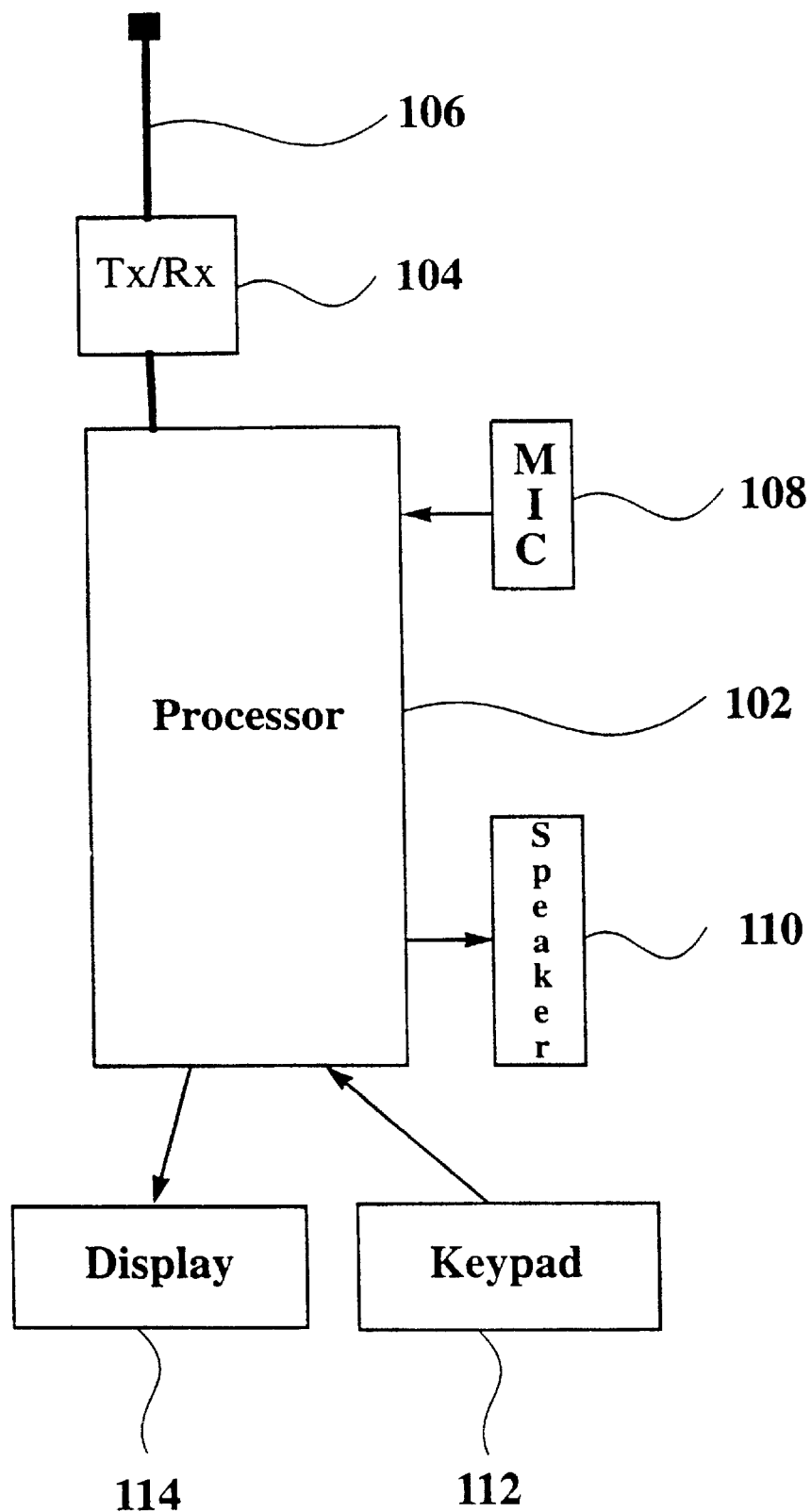

Referring now to FIG. 5, there is shown a simple perspective diagram of a mobile station 14 including a processor 102 connected to a transceiver 104. The antenna 106 is connected to the transceiver 104 for transmitting and receiving communications over a cellular telephone network. The mobile station 14 further includes a microphone 108 and a speaker 110 connected to the processor 102 for facilitating telephonic voice communications. A display panel 114 and a keyboard 112 are included in the mobile station and connected to the processor 102.

Although a preferred embodiment and the method and apparatus of the present invention has been illustrated in the accompanying drawings and described in the foregoing detailed description, it will be understood that the invention is not limited to the embodiment disclosed, but is capable of numerous re-arrangements, modifications and substitutions without departing the spirit of the invention as set forth and defined in the following claims.

What is claimed is:

1. An emergency call handling system within a cellular communication system for routing emergency voice calls and short message service (SMS) messages from a plurality of subscriber terminals to an emergency center (EC), said system comprising:

a mobile switching center (MSC) for controlling signaling with a plurality of base stations (BS's); and at least one subscriber terminal normally communicating with the MSC through one BS over a digital control channel (DCC) when in an idle mode and a voice channel (VC) when in an active subscriber communication mode, said one terminal including:

emergency call means within the terminal for initiating an emergency voice call via the BS through the MSC to the EC;

call failure detection means within the terminal for detecting when the emergency voice call has failed to be set up with the EC; and data transmission means within the terminal responsive to a call failure detection for transmitting an emergency SMS message over the DCC through the BS and MSC to the EC while not affecting the operation of the DCC as a control channel.

2. The emergency call handling system of claim 1 wherein the MSC further includes means to selectively route the emergency SMS message to the EC while routing non-emergency SMS messages to a SMS message center.

3. The emergency call handling system of claim 1 wherein the EC includes acknowledgment means that upon receipt of the emergency SMS message from said one terminal transmits an acknowledgment SMS message to the MSC, through the BS and over the DCC to said one terminal.

4. The emergency call handling system of claim 1 wherein the EC includes call back means responsive to the emergency SMS message that sends a call back to said one terminal through the MSC, BS and over the VC.

5. The emergency call handling system of claim 1 wherein said emergency SMS message includes 1) data information identifying the SMS message as an emergency and 2) data information relating to the identity of the terminal.

6. The emergency call handling system of claim 5 wherein the emergency SMS message further includes user medical history information.

7. An emergency call handling system within a cellular communication system for routing emergency voice calls and short message service (SMS) messages from a plurality of subscriber terminals to an emergency center (EC), said system comprising:

a mobile switching center (MSC) for controlling signaling with a plurality of base stations (BS's); and at least one subscriber terminal normally communicating with the MSC through one BS over a digital control channel (DCC) when in an idle mode and a voice channel (VC) when in an active subscriber communication mode, said one terminal including:

emergency call means within the terminal for initiating an emergency voice call via the BS through the MSC to the EC;

call failure detection means within the terminal for detecting when the emergency voice call has failed to be set up with the EC; and data transmission means within the terminal responsive to a call failure detection for transmitting an emergency SMS message over the DCC through the BS and MSC to the EC while not affecting the operation of the DCC as a control channel, the emergency SMS message including (1) data information identifying the SMS message as an emergency message, (2) data information relating to the identity of the terminal, and (3) data information corresponding to the location of the terminal.

8. The emergency call handling system of claim 1 wherein the MSC includes means for analyzing the emergency SMS message and adding to said emergency SMS message forwarded to the EC location information corresponding to the location of said terminal.

9. The emergency call handling system of claim 1 wherein the call failure detection means includes count means which counts up to a predetermined number of consecutive emergency call failures and thereafter enables the data transmission means to transmit said emergency SMS message.

10. The emergency call handling system of claim 1 wherein the call failure detection means enables the data transmission means to transmit said emergency SMS message upon determination that a failure to set up a call over the VC to the EC is the result of congestion.

11. An emergency call handling system within a cellular communication system having a plurality of cells and a plurality of subscriber terminals for routing emergency voice calls and short message service (SMS) messages from said subscriber terminals to an emergency center (EC), said system comprising:

a mobile switching center (MSC) including means to route said emergency voice calls to the EC;

a plurality of base stations (BS's) electronically connected to said MSC, each of said BS's transmitting radio frequency signals over at least one digital control channel and a plurality of voice channels over a coverage area defining one of said cells; and at least one subscriber terminal normally communicating with the MSC via one of said BS's over a corresponding channel selected from one of the group consisting of a digital control channel (DCC) and a voice channel (VC), said one terminal including:

emergency call means within the terminal for initiating an emergency voice call to the EC via the BS and the MSC;

call failure detection means within the terminal for detecting when the emergency voice call has failed to be set up with the EC; and data transmission means within the terminal responsive to a call failure detection for transmitting an emergency SMS message over the DCC to the BS and through the MSC to the EC while not affecting the operation of the DCC as a control channel.

12. The emergency call handling system of claim 11 wherein the EC comprises a public safety answering point (PSAP).

13. The emergency call handling system of claim 11 wherein the EC includes acknowledgment means that upon receipt of the emergency SMS message from said one terminal transmits an acknowledgment SMS message to the MSC, through the BS and over the DCC to said one terminal.

14. The emergency call handling system of claim 11 wherein the EC includes call back means responsive to the emergency SMS message that sends a call back to said one terminal through the MSC, BS and over the VC.

15. The emergency call handling system of claim 11 wherein said emergency SMS message includes 1) data information identifying the SMS message as an emergency and 2) data information relating to the identity of the terminal.

16. The emergency call handling system of claim 15 wherein the emergency SMS message further includes user medical history information.

17. The emergency call handling system of claim 15 wherein said emergency SMS message further includes SMS information corresponding to the location of the terminal.

18. The emergency call handling system of claim 11 wherein the MSC includes means for analyzing the emergency SMS message and adding to said emergency SMS message forwarded to the EC location information corresponding to the location of said terminal.

19. The emergency call handling system of claim 11 wherein the call failure detection means includes count means which counts up to a predetermined number of consecutive emergency voice call failures and thereafter enables the data transmission means to transmit said emergency SMS message.

20. The emergency call handling system of claim 11 wherein the call failure detection means enables the data transmission means to transmit said emergency SMS message upon determination that a failure to set up a voice call over the VC to the EC is the result of congestion.

21. A method for emergency call handling in a cellular communication system for routing emergency voice calls and short message service (SMS) messages from a plurality of subscriber terminals to an emergency center (EC) via a mobile switching center (MSC) controlling a plurality of base stations (BS's), said method comprising the steps of:

communicating from at least one of said subscriber terminals to the MSC over a digital control channel (DCC) and a voice channel (VC), said communicating step including:

initiating in the subscriber terminal, an emergency voice call to the EC over the VC to the BS and through the MSC to the EC, detecting in the subscriber terminal, when the emergency voice call has failed to be set up with the EC, and responsive to the subscriber terminal detecting a failed set up of the emergency voice call with the EC, transmitting from the subscriber terminal, an emergency SMS message over the DCC to the BS through the MSC while not affecting the operation of the DCC as a control channel, and the MSC transmitting the emergency SMS message to the EC.

22. The emergency call handling method of claim 21 further including the step of the EC transmitting a SMS acknowledgment message to said one terminal through the MSC, BS and over the DCC upon receipt of the emergency SMS message.

23. The emergency call handling method of claim 21 further including the step of the EC initiating a call back through the MSC, BS and over the VC to said one terminal upon receipt of the emergency SMS message.

24. The emergency call handling method of claim 21 wherein said emergency SMS message includes 1) data information identifying the SMS message as an emergency and 2) data information relating to the identity of the terminal.

25. A method for emergency call handling in a cellular communication system for routing emergency voice calls and short message service (SMS) messages from a plurality of subscriber terminals to an emergency center (EC) via a mobile switching center (MSC) controlling a plurality of base stations (BS's), said method comprising the steps of:

communicating from at least one of said subscriber terminals to the MSC over a digital control channel (DCC) and a voice channel (VC), said communicating step including:

initiating an emergency voice call to the EC over the VC to the BS and through the MSC to the EC, detecting when the emergency voice call has failed to be set up with the EC, and responsive to detecting a failed set up of the emergency voice call with the EC, transmitting an emergency SMS message over the DCC to the BS through the MSC while not affecting the operation of the DCC as a control channel, said emergency data message including (1) data information identifying the SMS message as an emergency, (2) data information relating to the identity of the terminal, and (3) data information corresponding to the location of the terminal; and the MSC transmitting the emergency SMS message to the EC.

26. The emergency call handling method of claim 21 further including the step of the MSC analyzing the emergency SMS message to determine if it is an emergency message, and adding to said emergency SMS message forwarded to the EC location information corresponding to the location of said terminal.

27. The emergency call handling method of claim 21 further including the step of said one terminal counting a predetermined number of emergency voice call failures and thereafter enabling said step of transmitting an emergency SMS message to said EC.

28. The emergency call handling method of claim 21 further including the step of detecting a failure to connect over a VC to the EC due to congestion and thereafter initiating the step of transmitting the emergency SMS message.

29. An emergency call handling system for a cellular communication system for routing emergency voice calls and short message service (SMS) messages from a plurality of subscriber terminals to an emergency center (EC), said system comprising:

a mobile switching center (MSC) for controlling signaling with a plurality of base stations (BS's);

at least one subscriber terminal normally communicating with the MSC through one BS, said one terminal including data transmission means for transmitting SMS messages including emergency SMS messages from the subscriber terminal over a digital control channel (DCC) through the BS to the MSC while not affecting the operation of the DCC as a control channel; and data analyzing means in the MSC for analyzing the SMS messages received from said one terminal to selectively route emergency SMS messages to the EC while routing non-emergency SMS messages to a SMS message center.

30. The emergency call handling system of claim 29 wherein the EC includes acknowledgment means that upon receipt of the emergency SMS message transmits an acknowledgment SMS message to the MSC, through the BS and over the DCC to said one terminal.

31. The emergency call handling system of claim 29 wherein the EC includes call back means responsive to the emergency SMS message that initiates a call back to said one terminal through the MSC, BS and over a voice channel (VC).

32. The emergency call handling system of claim 29 wherein said emergency SMS message includes 1) data information identifying the SMS message as an emergency and 2) data information relating to the identity of the terminal.

33. The emergency call handling system of claim 32 wherein the emergency SMS message further includes user medical history information.

34. An emergency call handling system for a cellular communication system for routing emergency voice calls and short message service (SMS) messages from a plurality of subscriber terminals to an emergency center (EC), said system comprising:

a mobile switching center (MSC) for controlling signaling with a plurality of base stations (BS's);

at least one subscriber terminal normally communicating with the MSC through one BS, said one terminal including data transmission means for transmitting SMS messages including emergency SMS messages over a digital control channel (DCC) through the BS to the MSC while not affecting the operation of the DCC as a control channel, said emergency SMS messages including (1) data information identifying the data message as an emergency, (2) data information relating to the identity of the terminal, and (3) data information corresponding to the location of the terminal; and data analyzing means in the MSC for analyzing the SMS messages received from said one terminal to route emergency SMS messages to the EC.

35. The emergency call handling system of claim 29 wherein the means for analyzing the emergency SMS message includes means for adding to said emergency SMS message forwarded to the EC location information corresponding to the location of said terminal.

36. The emergency call handling system of claim 29 further including call failure detection means for detecting when an emergency voice call to the EC has failed to be set up and, responsive thereto, enabling the data transmission means to transmit the emergency SMS message.

37. The emergency call handling system of claim 36 wherein the call failure detection means includes count means which counts up to a predetermined number of emergency voice call failures and thereafter enables the data transmission means to transmit said emergency SMS message.

38. The emergency call handling system of claim 36 wherein the call failure means enables the data transmission means to transmit said emergency SMS message upon determination that a failure to set up an emergency voice call with the voice channel to the EC is the result of congestion.

39. A method for emergency call handling in a cellular communication system for routing emergency voice calls and short message service (SMS) messages from a plurality of subscriber terminals to an emergency center (EC) via a mobile switching center (MSC) controlling a plurality of base stations (BS's), said method comprising the steps of:

transmitting, from at least one subscriber terminal, SMS messages, including emergency SMS messages, over a digital control channel (DCC) through the BS to the MSC while not affecting the operation of the DCC as a control channel;

determining in the MSC, whether SMS messages received from said one subscriber terminal are emergency SMS messages;

routing said SMS messages to the EC upon determining that said SMS messages are emergency SMS messages; and routing said SMS messages to a SMS message center upon determining that said SMS messages are not emergency SMS messages.

40. The emergency call handling method of claim 39 further including the step of the EC transmitting a SMS acknowledgment message to said one terminal through the MSC, BS and over a digital control channel upon receipt of the emergency SMS message to said one terminal.

41. The emergency call handling method of claim 39 further including the step of the EC initiating a call back to through the MSC, BS and over a voice to said one terminal after receipt of the emergency SMS message.

42. The emergency call handling method of claim 39 wherein said emergency SMS message includes 1) data information identifying the SMS message as an emergency and 2) data information relating to the identity of the terminal.

43. A method for emergency call handling in a cellular communication system for routing emergency voice calls and short message service (SMS) messages from a plurality of subscriber terminals to an emergency center (EC) via a mobile switching center (MSC) controlling a plurality of base stations (BS's), said method comprising the steps of:

transmitting, from at least one subscriber terminal, SMS messages, including emergency SMS messages, over a digital control channel (DCC) through the BS to the MSC while not affecting the operation of the DCC as a control channel, said emergency data messages including (1) data information identifying the data message as an emergency, (2) data information relating to the identity of the terminal, and (3) data information corresponding to the location of the terminal;

determining in the MSC, whether SMS messages received from said one subscriber terminal are emergency SMS messages; and routing said SMS messages to the EC upon determining that said SMS messages are emergency SMS messages.

44. The emergency call handling method of claim 39 further including the step of the MSC adding location information to said emergency SMS message forwarded to the EC corresponding to the location of said terminal.

45. The emergency call handling method of claim 39 further including the steps of detecting when an emergency voice call to the EC has failed to be set up and, responsive thereto, enabling the step of transmitting the emergency SMS messages.

46. The emergency call handling system of claim 45 wherein the detecting step includes counting up to a predetermined number of emergency voice call failures and thereafter enabling the step of transmitting the emergency SMS messages.

* * * * *